T. J. TREW.
AUTOMATIC REELING DEVICE.
APPLICATION FILED FEB. 16, 1920.
1,417,429.
Patented May 23, 1922.
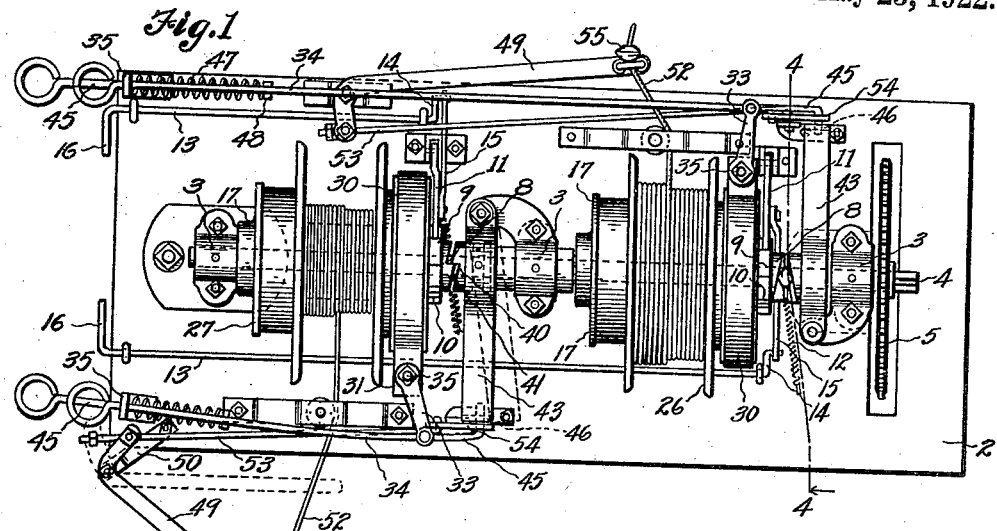
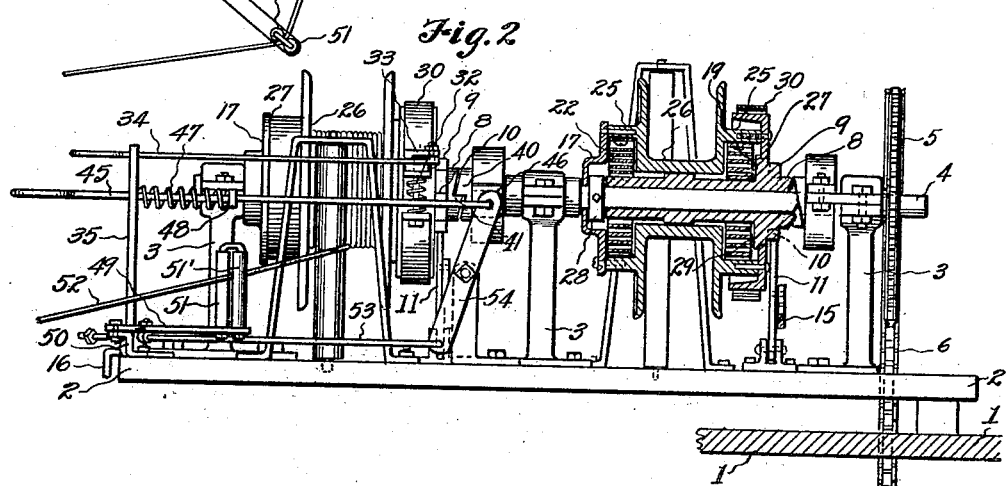
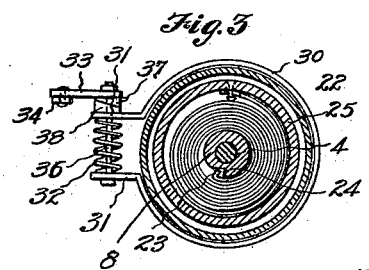
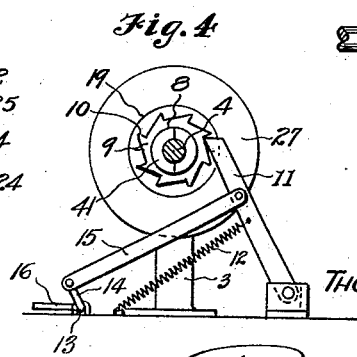
Inventor
THOMAS J. TREW
By Richard J. Cook
Attorney

UNITED STATES PATENT OFFICE.

THOMAS J. TREW, OF SEATTLE, WASHINGTON, ASSIGNOR TO KING AUTOMATIC TROLLER CO., OF SEATTLE, WASHINGTON, A CORPORATION OF WASHINGTON.

AUTOMATIC REELING DEVICE.

1,417,429. Specification of Letters Patent. Patented May 23, 1922.

Application filed February 16, 1920. Serial No. 359,102.

*To all whom it may concern:*

Be it known that I, THOMAS J. TREW, a citizen of the United States, and resident of the city of Seattle, county of King, and State of Washington, have invented certain new and useful Improvements in Automatic Reeling Devices, of which the following is a specification.

The invention relates to improvements in automatic reeling devices for trolling lines, and more particularly to power actuated reeling devices applicable to motor driven fishing boats.

The object of the invention is to provide one, or a plurality of automatic reeling devices for trolling lines that can be mounted upon the deck of a fishing motor boat and having communicating means with the propeller shaft thereof for effecting its actuation.

A further object resides in the provision of a spring actuated reel that imparts a yielding tension to the line at all times, whereby, when the fish strikes, it yields sufficiently to set the hook in the mouth of the fish without tearing the cartilage. The spring actuated reel likewise instantly recovers the line as the run takes place, and thus no slackness is permitted therein to afford an opportunity for the fish to shake the hook out of its mouth. The line is then reeled in under motor power, which is automatically disconnected when the fish has been brought up to the boat and the fish is held there until recovered from an untangled line.

A still further object resides in the manner of feeding the line back into the water under a friction control.

The invention consists in the arrangement, construction, and combination of parts, as will be more fully described in the following specification, illustrated in the accompanying drawings, and finally pointed out in the appended claims.

In the drawings, Figure 1 is a plan view of my automatic reeling device.

Figure 2 is a side elevation, partly in section, of the same.

Figure 3 is a transverse vertical section taken through one of the spring drums.

Figure 4 is a transverse section taken substantially on the line 4—4 of Figure 1.

Referring more in detail to the drawings; 1 represents what may be the rear top deck of a fishing boat and upon this deck is mounted a frame structure 2 upon which the automatic reeling devices and associated mechanisms are supported.

Revolubly mounted upon the frame structure 2, by means of a plurality of upright standards 3 placed in alinement lengthwise of the frame, is a shaft 4 which is adapted to actuate the reels later described. This shaft, at one end, has a sprocket wheel 5 keyed thereon over which a chain belt 6, driven by a similar sprocket wheel that is mounted on the propeller shaft 7, may operate to drive the shaft 4.

Disposed upon the shaft 4 are the automatic reels, of which there may be one or more, each of which has a sleeve hub 8 extended coaxially therethrough upon which the reel is revolubly mounted and which in turn is adapted for axial rotation upon the shaft 4. 9 is an integrally formed collar at one end of said hub and this is provided around its outer periphery with a series of notches 10 for the reception of a dog engaging element 11, pivotally mounted on the frame at its lower end and adapted to be manually thrown out of contact with the collar 9. The dog is normally retained in contact with the collar by means of a spring 12, fixed thereto and to the frame, and the manual control mechanism comprises a shaft 13 revolubly mounted on the frame, provided at one end with a crank arm 14 which is connected at its end through a link 15 with the dog, and at its opposite end has a laterally turned portion 16 which may serve as a handle to turn the shaft to actuate the dog.

Torsion springs 22 are provided upon said hub, the inner ends thereof being provided with an inwardly turned portion 23 adapted to engage within a stop portion 24 formed in the periphery of the hub. This provision enables the ends to disengage from the stops when the springs are unwound, and thereby precludes breaking by back lashing; the other ends of said springs being fixedly attached to the lateral extension flange 25 of the rotatably mounted yoke-shaped reel 26 disposed intermediate the springs. Fixedly attached to the lateral extension flange 25, or formed integral therewith, is the end plate 27 which is adapted to come in contact centrally thereof with a shoulder 19 provided upon the collar 9 and thus serves as an end bearing for the reel 26 in its rotary movement upon the hub 8.

28 is a collar fixedly secured upon the shaft 4 and is disposed intermediate the opposite end plate 17 of the reel and the spring 22, and 29 is an inward extension of the collar 9 of an increased diameter and the function of the fixedly formed collar 28 and extension 29 being to prevent longitudinal displacement of the reel in its bearing contact with the central hub portion 8 preferably of increased diameter.

Enclosing the periphery of the plate 27 is a brake band 30 provided with parallel, laterally turned end portions 31 between which a spring 32 is mounted to yieldingly retain the band disengaged from the drum; the band being tightened about the drum by means of a short lever 33 that is connected thereto and which in turn is actuated by an extension lever 34 which extends at its outer end slidably through a supporting standard 35 to one end of the frame 2, the lever 33 being fixed revolubly on the upper end of a bolt 36 which connects the ends of the band 30 and having a head 37 thereon provided with an inclined face which engages a similar head 38 on one end of the band so that radial movement of the lever causes a tightening or loosening of the band.

40 is a jaw tooth clutch keyed for longitudinal movement upon the shaft 4 and is adapted to engage the clutch engaging element 41 provided upon the end of the hub 8. The clutch is provided with an actuating lever 43 pivotally mounted at its inner end on an extension from a standard 3 and movable at its outer end to actuate the clutch into or from operative engagement with the hub 8 of the reel.

Manual means for actuating the clutch lever 43 to move the clutch into engagement with the reel hub, comprises a shaft 45 which is pivotally fixed at its inner end to the down turned outer end 46 of the lever and at its outer end is slidable through the standard 35. A spring 47 is wound about this shaft 45 which bears against a lug 48 thereon and against the standard 35 to yieldingly retain the clutch disengaged from the reel.

The automatic means for shifting the clutch to stop winding in of the line, consists of a bell crank lever 49, which is pivotally carried by a bracket 50 on the frame 2, and which at one end carries two guide rollers 51, 51', between which the line 52 passes onto the reel, and at its opposite end is connected through a rod 53 and a centrally pivoted lever 54 with the outer end of the clutch lever 43; the lever 54 being pivotally connected at its upper end with the lever 43 and at its lower end with the rod 53, so that a stop 55, fixed to the line near the hook end, will engage the rollers when the line is drawn in to rock the bell-crank lever to shift the clutch and prevent further winding of the reel.

The operation of the automatic reeling device may be described as follows: We will assume the fisherman has reached the trolling waters, and desires to feed the trolling line which is spooled upon the yoke portion of the reel, into the water; the dog engaging element 11 is thrown out of contact with the hub, the sinker upon the end of the line is thrown overboard, and the inertia of the water through which the line is drawn by the moving boat, causes the reel to unwind. The speed at which the reel unwinds being controlled by the lever 33 which actuates the friction brake band 30.

It is obvious, as the reel unwinds, the torsion springs are wound into compression upon the hub 8, which is held against further reverse rotary movement by throwing in the dog engaging element 11. The tension of the spring, when wound into compression, is adjusted to equalize approximately the tension upon the trolling line in the water, thus the sensitiveness of the spring adjustment, when the line is extended, will cause the reel to respond instantly and yield line just enough when a strike is registered to set the hook firmly in the mouth of the fish without snagging the cartilage thereof. Upon the strike of the fish, which is followed by its rush, the tension of the spring being now greater then the momentary reduced tension upon the line, due to the rush of the fish, instantly winds up and thus keeps a tight line upon the fish. At this stage of the proceedings the fisherman throws in the clutch 40 and the hub 8 of the reel is rotated to wind up the trolling line.

When the fish has been reeled in, the stop 55 on the line throws the bell crank inwardly to throw the clutch out, to prevent further winding of the reel, unwinding being prevented by engagement of the dog 11 with the hub 8.

The fish may then be removed and the dog engaging element thrown out to permit the line to be fed out, under control of the clutch, to the water as above described.

While I have illustrated and described my preferred form of construction for carrying into execution the objects and aims of my invention, I am fully cognizant of the fact that various mechanical changes in the details of construction can be made to accomplish the result within the scope of the following claims.

What I claim as new, and desire to protect by Letters Patent is:

1. An automatic reeling device for trolling lines comprising in combination with a rotatably driven shaft, a sleeve hub rotatably mounted on the shaft, a reel rotatably mounted on the sleeve, a spring coiled about the sleeve and having a fixed connection at one end with the reel and a disconnectable winding connection with the sleeve hub, independently operable means engageable with the sleeve hub to preclude free reverse winding of the reel and means on the shaft engageable with the hub to drive the latter to rotate the reel.

2. An automatic reeling device for trolling lines comprising in combination with the propeller shaft of a motor boat, a reel shaft rotatably mounted on said boat, means for driving the latter shaft from the propeller shaft, a sleeve hub revolubly fixed on the reel shaft, a reel rotatably mounted on said hub, yieldable means providing a winding connection between said sleeve and reel, a clutch slidably keyed on said reel shaft engageable with the sleeve to drive the reel and automatically operating mechanism adapted to be actuated by engagement therewith of a stop member fixed to a line being wound in on said reel for engaging the driving clutch from the sleeve.

3. An automatic reeling device for trolling lines, comprising in combination with a rotatably driven shaft, a sleeve hub rotatable on the shaft, a reel rotatable on the sleeve and having a drum formed at one end thereof, a spring coiled within the drum about the sleeve having a fixed connection with the drum and a disconnectable winding connection with the sleeve, a manually movable lever engageable with the sleeve to prevent reverse winding of the reel, a brake band positioned about the drum operable to retard and control the speed of reverse winding when said manual means is relieved, a shiftable clutch upon the shaft engageable with the sleeve to drive the latter to rotate the reel, and a trip lever adapted to be actuated by a stop member fixed to a line being wound in on the reel for disengaging the driving clutch from the sleeve.

Signed at Seattle, Washington, this 30th day of January, 1920.

THOMAS J. TREW.